United States Patent
Fukuda et al.

(10) Patent No.: US 10,258,921 B2
(45) Date of Patent: Apr. 16, 2019

(54) GAS SEPARATION SYSTEM AND ENRICHED GAS PRODUCTION METHOD

(71) Applicant: Ube Industries, Ltd., Yamaguchi (JP)

(72) Inventors: Nobuhiko Fukuda, Yamaguchi (JP); Tomohide Nakamura, Yamaguchi (JP)

(73) Assignee: UBE INDUSTRIES, LTD., Yamaguchi (JP)

( * ) Notice: Subject to any disclaimer, the term of this patent is extended or adjusted under 35 U.S.C. 154(b) by 0 days.

(21) Appl. No.: 15/986,121

(22) Filed: May 22, 2018

(65) Prior Publication Data

US 2018/0339264 A1  Nov. 29, 2018

Related U.S. Application Data

(63) Continuation of application No. 14/672,257, filed on Mar. 30, 2015, now abandoned.

(30) Foreign Application Priority Data

| Mar. 31, 2014 | (JP) | .................................. | 2014-73239 |
| Feb. 27, 2015 | (JP) | .................................. | 2015-39375 |

(51) Int. Cl.
*B01D 53/22* (2006.01)
(52) U.S. Cl.
CPC ...... *B01D 53/226* (2013.01); *B01D 2053/221* (2013.01)
(58) Field of Classification Search
CPC ............ B01D 53/226; B01D 2053/221; B01D 53/225; B01D 53/227; B01D 63/04; B01D 63/043; B01D 63/046
See application file for complete search history.

(56) References Cited

U.S. PATENT DOCUMENTS

| 3,256,675 | A | * | 6/1966 | Robb | ..................... | B01D 53/22 |
| | | | | | | 95/53 |
| 3,274,750 | A | * | 9/1966 | Robb | ................... | B01D 53/226 |
| | | | | | | 95/45 |
| 4,857,081 | A | * | 8/1989 | Taylor | .................. | B01D 17/085 |
| | | | | | | 95/52 |
| 6,168,649 | B1 | | 1/2001 | Jensvold et al. | | |
| 6,425,267 | B1 | | 7/2002 | Baker et al. | | |
| 6,565,626 | B1 | | 5/2003 | Baker et al. | | |

(Continued)

FOREIGN PATENT DOCUMENTS

| CN | 102470329 | 5/2012 |
| CN | 102858431 | 1/2013 |

(Continued)

*Primary Examiner* — Anthony R Shumate
(74) *Attorney, Agent, or Firm* — Young & Thompson (57) ABSTRACT

In a gas separation system, a retentate gas discharge port of a first unit U1 and a gas inlet port of a second unit U2 are connected by a retentate gas discharge line. A permeate gas discharge port of U1 and a gas inlet port of a third unit U3 are connected by a permeate gas discharge line. A feed gas mixture supply line is connected to a gas inlet port of U1. A permeate gas discharge port of U2 and the feed gas mixture supply line are connected by a permeate gas return line. A retentate gas discharge port of U3 and the feed gas mixture supply line are connected by a retentate gas return line. At least in operation, the gas permeability of U2 is higher than that of U3, and the gas selectivity of U3 is higher than that of U2.

7 Claims, 2 Drawing Sheets

(56) References Cited

U.S. PATENT DOCUMENTS

| | | |
|---|---|---|
| 7,537,641 B2 | 5/2009 | Lokhandwala et al. |
| 8,182,592 B2 | 5/2012 | Nakamura et al. |
| 8,999,038 B2 | 4/2015 | Ungerank |
| 2005/0045029 A1 | 3/2005 | Colling et al. |
| 2007/0125537 A1 | 6/2007 | Lokhandwala et al. |
| 2010/0186586 A1* | 7/2010 | Chinn .................. B01D 53/22 95/45 |
| 2011/0077446 A1 | 3/2011 | Shanbhag et al. |
| 2011/0167821 A1 | 7/2011 | Baker et al. |
| 2011/0305310 A1 | 12/2011 | Sanchez et al. |
| 2012/0123079 A1 | 5/2012 | Ungerrank et al. |
| 2012/0304856 A1 | 12/2012 | Kanetsuki et al. |
| 2013/0032028 A1 | 2/2013 | Miyazawa et al. |
| 2013/0042755 A1 | 2/2013 | Majumdar et al. |
| 2013/0098242 A1 | 4/2013 | Ungerank et al. |
| 2013/0199988 A1 | 8/2013 | Jons et al. |
| 2014/0047982 A1 | 2/2014 | Fukuda et al. |
| 2014/0138313 A1 | 5/2014 | Sato |
| 2014/0283690 A1 | 9/2014 | Smith et al. |
| 2015/0007729 A1 | 1/2015 | Kanetsuki et al. |
| 2015/0090117 A1 | 4/2015 | Baggerud et al. |
| 2015/0096930 A1 | 4/2015 | Taniguchi et al. |
| 2016/0310912 A1 | 10/2016 | Ungerank et al. |

FOREIGN PATENT DOCUMENTS

| | | |
|---|---|---|
| JP | 2013-534863 | 9/2013 |
| WO | WO 2011009919 | 1/2011 |
| WO | 2013-124339 | 8/2013 |

\* cited by examiner

GAS SEPARATION SYSTEM AND ENRICHED GAS PRODUCTION METHOD

TECHNICAL FIELD

The present invention relates to a gas separation system that separates a gas mixture by using a plurality of gas separation membrane units, and an enriched gas production method using this gas separation system.

BACKGROUND ART

The membrane separation method, which employs the difference in gas permeability with respect to a membrane, is known as a method for separating a gas mixture including at least two different gas species into the respective gases. With this method, at least either a highly-pure high-permeability gas or a highly-pure low-permeability gas, which are the target gases, can be obtained by recovering the permeate gas and/or the retentate gas. The permeability—which is the volume of permeation, through a membrane, of each gas included in the gas mixture per unit membrane area, per unit time, per unit partial pressure difference—can be expressed as P' (unit: $\times 10^{-5}$ cm$^3$ (STP)/cm$^2$·sec·cmHg). The gas selectivity of the membrane can be expressed as the ratio of the permeability of the high-permeability gas to the permeability of the low-permeability gas (i.e., high-permeability gas's permeability/low-permeability gas's permeability).

Generally speaking, a gas separation membrane with high gas selectivity has a low gas permeability, and conversely, a membrane with a high gas permeability has a low gas selectivity. Thus, in cases of recovering a low-permeability gas from a gas mixture by using a single-stage gas separation membrane, the use of a membrane with high gas selectivity increases the recovery rate if the purity of the gas to be recovered is constant. In this case, however, the permeability is low, and thus, it is necessary to increase the membrane area or increase operation pressure. On the other hand, a membrane having a high permeability does not require an increase in membrane area or an increase in operation pressure, but because its gas selectivity is low, the recovery rate is reduced.

In general, a gas separation membrane is employed in the form of a gas separation membrane module wherein the gas separation membrane having gas permselectivity is housed inside a container which includes at least a gas inlet port, a permeate gas discharge port, and a retentate gas discharge port. The gas separation membrane is installed inside the container in a manner so as to separate the space on the gas feed side and the space on the gas permeation side. In a gas separation system, in general, a plurality of such gas separation membrane modules are combined in parallel and are used as a gas separation membrane unit in order to obtain a predetermined membrane area. The plurality of gas separation membrane modules constituting the gas separation membrane unit share the gas inlet port, the retentate gas discharge port, and the permeate gas discharge port, and thus, the gas separation membrane unit functions substantially as a large gas separation membrane module.

In order to recover the target low-permeability gas with high purity and a high recovery rate, a known method employs a system that includes multiple stages of the aforementioned gas separation membrane units. Examples of such multi-stage gas separation systems include: a system in which retentate gas of the first stage obtained by enriching a low-permeability gas is further separated in order to increase purity; and a system in which low-permeability gas included in the permeate gas of the first stage is recovered in order to improve the recovery rate.

As regards multi-stage gas separation membrane units, Patent Literature 1, for example, proposes a gas separation method involving three gas separation membrane units, which correspond to separation stages (1) to (3). In the gas separation method disclosed in Patent Literature 1, a gas mixture to be separated is fed to a separation stage (1) (first gas separation membrane unit). Retentate gas discharged from the separation stage (1) is supplied to a separation stage (2) (second gas separation membrane unit), and permeate gas discharged from the first gas separation membrane unit is fed to a separation stage (3) (third gas separation membrane unit). Further, permeate gas discharged from the second gas separation membrane unit and also retentate gas discharged from the third gas separation membrane unit are returned to the first gas separation membrane unit (cf. FIG. 11 of Patent Literature 1). Claim 1 of Patent Literature 1 describes that "preferably, in all of the three membrane separation stage (1) to (3), the mixed gas selectivity is at least 30", and the Example described therein employs three separation membrane units having the same, high gas selectivity.

CITATION LIST

Patent Literature

Patent Literature 1: JP 2013-534863A

SUMMARY OF INVENTION

Technical Problem

Unfortunately, in cases where three gas separation membrane units having the same, high gas selectivity are used as in Patent Literature 1, the gas permeability is low; thus, in order to obtain gas with a predetermined purity and with a high recovery rate, it is necessary to increase the total membrane area in the system—for example, it is necessary to increase the number of membrane modules.

On the other hand, by using three gas separation membrane units having similarly low gas selectivity, it is possible to reduce the total membrane area in the system, but in this case, the recovery rate of the target gas deteriorates, and the advantage of using three gas separation membrane units in combination is nullified.

An objective of the present invention is to provide a gas separation system and an enriched gas production method with which it is possible to overcome the drawbacks of the aforementioned conventional art.

Solution to Problem

As a result of diligent research to solve the aforementioned problem, Inventors have found that both an extremely high recovery rate and a reduction in membrane area in the entire system can be achieved by making the gas permeability of the second gas separation membrane unit higher than the gas permeability of the third gas separation membrane unit, and making the gas selectivity of the third gas separation membrane unit higher than the gas selectivity of the second gas separation membrane unit at least in system operation in a gas separation system having three gas separation membrane units as described above.

The present invention solves the aforementioned problem by providing a gas separation system, in which a feed gas mixture comprising at least two different gas species is supplied to gas separation membrane units and at least one gas species among the gas species included in the feed gas mixture is enriched, wherein:

the gas separation membrane units comprise a first gas separation membrane unit, a second gas separation membrane unit, and a third gas separation membrane unit;

each of the gas separation membrane units includes at least a gas inlet port, a permeate gas discharge port, and a retentate gas discharge port;

the retentate gas discharge port of the first gas separation membrane unit and the gas inlet port of the second gas separation membrane unit are connected by a retentate gas discharge line;

the permeate gas discharge port of the first gas separation membrane unit and the gas inlet port of the third gas separation membrane unit are connected by a permeate gas discharge line;

a feed gas mixture supply line is connected to the gas inlet port of the first gas separation membrane unit and a first compression means is interposed and arranged in midstream of the feed gas mixture supply line;

the permeate gas discharge port of the second gas separation membrane unit and a position on a suction side of the first compression means in the feed gas mixture supply line are connected by a permeate gas return line;

the retentate gas discharge port of the third gas separation membrane unit and a position on the suction side or a discharge side of the first compression means in the feed gas mixture supply line are connected by a retentate gas return line;

an enriched gas is taken out from either the retentate gas discharge port of the second gas separation membrane unit or the permeate gas discharge port of the third gas separation membrane unit;

and at least in operation, the gas permeability of the second gas separation membrane unit is higher than the gas permeability of the third gas separation membrane unit, and the gas selectivity of the third gas separation membrane unit is higher than the gas selectivity of the second gas separation membrane unit.

The present invention solves the aforementioned problem by also providing an enriched gas production method wherein a feed gas mixture comprising at least two different gas species is supplied to a gas separation system and the gas separation system is operated to produce an enriched gas in which at least one gas species among the gas species included in the feed gas mixture is enriched, the method comprising:

employing, as the gas separation system, a gas separation system including a first gas separation membrane unit, a second gas separation membrane unit, and a third gas separation membrane unit, wherein: each of the gas separation membrane units is provided with a gas inlet port, a permeate gas discharge port, and a retentate gas discharge port; the retentate gas discharge port of the first gas separation membrane unit and the gas inlet port of the second gas separation membrane unit are connected by a retentate gas discharge line; the permeate gas discharge port of the first gas separation membrane unit and the gas inlet port of the third gas separation membrane unit are connected by a permeate gas discharge line; a feed gas mixture supply line is connected to the gas inlet port of the first gas separation membrane unit and a first compression means is interposed and arranged in midstream of the feed gas mixture supply line; the permeate gas discharge port of the second gas separation membrane unit and a position on the suction side of the first compression means in the feed gas mixture supply line are connected by a permeate gas return line; and the retentate gas discharge port of the third gas separation membrane unit and a position on the suction side or a discharge side of the first compression means in the feed gas mixture supply line are connected by a retentate gas return line;

supplying the feed gas mixture to the first gas separation membrane unit through the feed gas mixture supply line, and taking out an enriched gas from either the retentate gas discharge port of the second gas separation membrane unit or the permeate gas discharge port of the third gas separation membrane unit; and operating the gas separation system under conditions in which the gas permeability of the second gas separation membrane unit is higher than the gas permeability of the third gas separation membrane unit, and the gas selectivity of the third gas separation membrane unit is higher than the gas selectivity of the second gas separation membrane unit.

Effects of Invention

With the present invention, it is possible to reduce the membrane area in the entire system—e.g., reduce the number of membrane modules—and thus reduce initial cost, while maintaining a high target-gas recovery rate. Thus, the gas separation system of the invention is economically effective.

DESCRIPTION OF EMBODIMENTS

The present invention is described below according to preferred embodiments and examples thereof with reference to the drawings.

First, a gas separation system 10 according to a first embodiment of the invention and an enriched gas production method according to the first embodiment of the invention for producing an enriched gas by using the gas separation system 10 are described with reference to FIG. 1. The gas separation system 10 illustrated in FIG. 1 includes three gas separation membrane units: a first gas separation membrane unit 11, a second gas separation membrane unit 12, and a third gas separation membrane unit 13. As for each gas unit 11, 12, 13, it is possible to use, for example, a module 40 in which a gas separation membrane 30 made of e.g. hollow-fiber membranes and having gas permselectivity is housed inside a casing 31, as illustrated in FIG. 2. Each gas separation membrane unit 11, 12, 13 in this embodiment employs a single gas separation membrane module 40 as illustrated in FIG. 2, or employs a module set in which a plurality of modules 40 are arranged in parallel. The two opposing surfaces of the casing 31 in each module 40 are open, and form openings 32. It should be noted that these openings 32 are for inserting the gas separation membrane 30 into the casing 31, and are not the openings of the gas separation membrane 30. The gas separation membrane 30 is housed inside the casing 31 through the opening 32. In cases where the gas separation membrane 30 is constituted by a hollow-fiber membrane bundle, the gas separation membrane 30 is housed inside the casing 31 such that, in a state where the membrane is housed inside the casing 31, the respective ends of the hollow-fiber membranes are opened in the vicinity of the respective openings 32 of the casing 31.

In a state where the gas separation membrane 30 is housed inside the casing 31, the gas separation membrane 30 is fixed to the inner wall of the casing 31 by tube sheets 33, 34 at positions at respective ends in the Y direction, which is the direction in which the hollow-fiber membranes extend. The openings 32 of the casing 31 are closed by respective lids 35, 36. The lid 35 is provided with a gas inlet port 37. The lid 36 is provided with a retentate gas discharge port 38. The gas mixture to be separated is introduced into the module from the gas inlet port 37 of the lid 35. Of the introduced gases, gas that permeated the gas separation membrane 30 is discharged outside the module from a permeate gas discharge port 39 provided in the casing 31. On the other hand, retentate gas that did not permeate the gas separation membrane 30 is discharged outside the module from the retentate gas discharge port 38 in the lid 36. In some cases, a purge gas supply port (not illustrated) may be provided in the casing 31. Although the above explanation is based on the separation membrane module illustrated in FIG. 2, it goes without saying that the present invention is applicable to separation membrane modules with other configurations— for example, the invention is applicable to shell-feed-type modules.

Returning to FIG. 1, the first gas separation membrane unit 11 and the second gas separation membrane unit 12 are connected in series, as illustrated in FIG. 1. More specifically, the first gas separation membrane unit 11 and the second gas separation membrane unit 12 are connected by connecting the retentate gas discharge port 1b of the first gas separation membrane unit 11 and the gas inlet port 12a of the second gas separation membrane unit 12 by a retentate gas discharge line 14.

Figure 1:
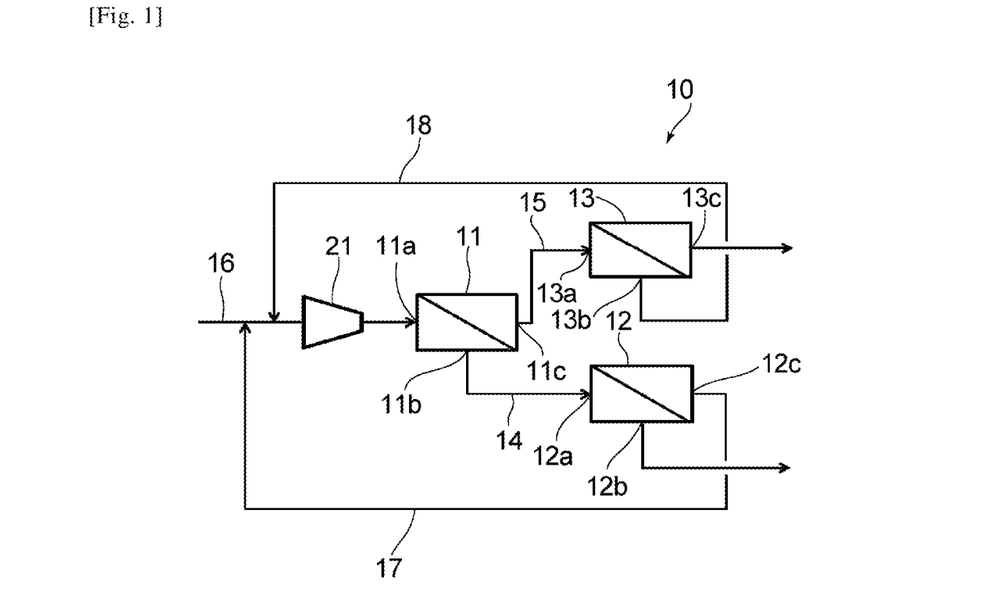
FIG. 1 is a schematic diagram illustrating the configuration of a gas separation system according to a first embodiment of the present invention.
Figure 2:
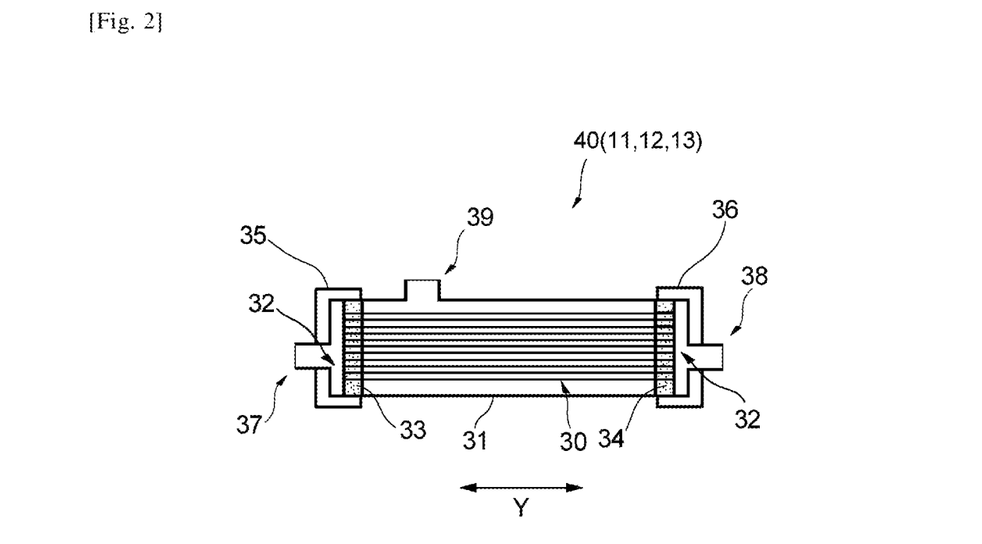
FIG. 2 is a schematic diagram illustrating the structure of an example of a gas separation membrane module used in the gas separation system of the present invention.

Further, as illustrated in FIG. 1, the first gas separation membrane unit 11 and the third gas separation membrane unit 13 are connected in series. More specifically, the first gas separation membrane unit 11 and the third gas separation membrane unit 13 are connected by connecting the permeate gas discharge port 11c of the first gas separation membrane unit 11 and the gas inlet port 13a of the third gas separation membrane unit 13 by a permeate gas discharge line 15.

A feed gas mixture supply line 16 for supplying a feed gas mixture, which is the feed supplied from a gas mixture source (not illustrated), to the first gas separation membrane unit 11 is connected to the gas inlet port 11a of the first gas separation membrane unit 11. A first compression means 21 is interposed and arranged in midstream of the feed gas mixture supply line 16. The first compression means 21 is provided with the aim of pressurizing the gas mixture supplied from the gas mixture source, and with the aim of pressurizing permeate gas discharged from the second gas separation membrane unit 12 when the permeate gas is returned to the first gas separation membrane unit 11 and pressurizing retentate gas discharged from the third gas separation membrane unit 13 when the retentate gas is returned to the first gas separation membrane unit 11.

The permeate gas discharge port 12c of the second gas separation membrane unit 12 and a position on the suction side of the first compression means 21 in the feed gas mixture supply line 16 are connected by a permeate gas return line 17. On the other hand, the retentate gas discharge port 13b of the third gas separation membrane unit 13 and a position on the suction side of the first compression means 21 in the feed gas mixture supply line 16 are connected by a retentate gas return line 18.

The operation of the gas separation system 10 of the present embodiment configured as above is described below. A feed gas mixture to be separated is supplied from a gas mixture source (not illustrated) to the first gas separation membrane unit 11 through the feed gas mixture supply line 16. Before being supplied, the gas mixture is pressurized by the first compression means 21, and its pressure is increased. As for the first compression means 21, it is possible to use means similar to those conventionally used in this technical field. For example, a compressor (compressing machine) may be used.

The gas mixture includes at least gas A and gas B, which are two different gas species to be separated. The gas species A and B are not particularly limited. When the gas mixture pressurized by the first compression means 21 is supplied to the first gas separation membrane unit 11, the gas mixture is separated into permeate gas, which is gas that permeated the gas separation membrane, and retentate gas, which is gas that did not permeate the gas separation membrane, due to a difference in permeability with respect to the gas separation membrane. In the description below, for convenience' sake, the gas A is a gas having a high permeability with respect to the gas separation membrane—i.e., a high-permeability gas; whereas the gas B is a gas having a low permeability with respect to the gas separation membrane— i.e., a low-permeability gas. The retentate gas discharged from the first gas separation membrane unit 11 is a gas in which the gas B is more concentrated compared to the gas mixture, which is the raw material. The retentate gas is discharged from the retentate gas discharge port 11b of the first gas separation membrane unit 11, and is supplied to the second gas separation membrane unit 12 through the retentate gas discharge line 14. On the other hand, the permeate gas from the first gas separation membrane unit 11 is a gas in which the gas A is more concentrated compared to the gas mixture, which is the raw material. The permeate gas is discharged from the permeate gas discharge port 11c of the first gas separation membrane unit 11, and is supplied to the third gas separation membrane unit 13 through the permeate gas discharge line 15.

The gas introduced to the third gas separation membrane unit 13 (i.e., a gas-A-enriched gas) is separated into permeate gas and retentate gas by the unit 13. The permeate gas is a gas in which the gas A is further concentrated and enriched compared to the gas introduced to the third gas separation membrane unit 13, and the permeate gas is taken out from the permeate gas discharge port 13c of the unit 13. On the other hand, the retentate gas is discharged from the retentate gas discharge port 13b of the third gas separation membrane unit 13, and is returned to the suction side of the first compression means 21 in the feed gas mixture supply line 16 via the retentate gas return line 18 connected to the discharge port 13b.

On the other hand, the retentate gas discharged from the retentate gas discharge port 11b of the first gas separation membrane unit 11 is introduced to the second gas separation membrane unit 12. The gas introduced to the second gas separation membrane unit 12 is separated into permeate gas and retentate gas by the unit 12. The retentate gas is a gas in which the gas B is further concentrated and enriched compared to the gas introduced to the second gas separation membrane unit 12, and the retentate gas is taken out from the retentate gas discharge port 12b of the unit 12. On the other hand, the permeate gas is discharged from the permeate gas discharge port 12c of the second gas separation membrane unit 12, and is returned to the suction side of the first compression means 21 in the feed gas mixture supply line 16 via the permeate gas return line 17 connected to the discharge port 12c. The permeate gas and the retentate gas that have been returned are mixed with the gas mixture, which is the raw material, and are pressurized by the first compression means 21.

Generally speaking, the gas A included in the gas mixture has a relatively higher permeability than the gas B to all of the gas separation membrane units 11, 12, 13. On the other hand, the gas B included in the gas mixture has a relatively lower permeability than the gas A to all of the gas separation membrane units 11, 12, 13.

As regards the gas separation membrane units 11, 12, 13 employed in the gas separation system 10, at least in operation, the gas permeability of the second gas separation membrane unit 12 is made higher than the gas permeability of the third gas separation membrane unit 13, and the gas selectivity of the third gas separation membrane unit 13 is made higher than the gas selectivity of the second gas separation membrane unit 12. Inventors of the present invention have found that, by employing this configuration in a gas separation system in which a first gas separation membrane unit is connected in series to each of second and third gas separation membrane units, it is possible to greatly reduce the membrane area of the second gas separation membrane unit 12 while hardly reducing the purity of the obtained gas and gas recovery rate—particularly the recovery rate of the low-permeability gas—compared to cases where the gas separation selectivities in operation of the respective first to third gas separation membrane units are all made uniformly high. For example, in cases where the second gas separation membrane unit 12 is constituted by hollow-fiber membrane modules as illustrated in FIG. 2, the number of membrane modules can be reduced. Thus, in the present invention, it is possible to reduce the total membrane area in the system—e.g., the number of membrane modules—while maintaining a predetermined gas purity and gas recovery rate, and thus, initial system cost can be reduced and space saving can be achieved. It should be noted that, if a passage in the present Specification simply states "in operation", the operation is not limited to a specific operation condition, but it goes without saying that the statement encompasses e.g. both cases where the units 11 to 13 operate at different temperatures as described further below, and cases where the units 11 to 13 all operate at the same temperature.

The aforementioned gas permeability is the permeability of the gas A (high-permeability gas), which is the gas—among the gases A and B included in the gas mixture—of which the permeability is to be made high in the second gas separation membrane unit 12. In operation, the gas selectivity and/or gas permeability of the first gas separation membrane unit 11 may be the same as, or different from, that of the second gas separation membrane unit 12. In cases where the selectivity and/or permeability of the first gas separation membrane unit 11 are/is different, the selectivity and/or permeability may be higher or lower than that of the second gas separation membrane unit 12. In operation, the gas selectivity and/or gas permeability of the first gas separation membrane unit 11 may be the same as, or different from, that of the third gas separation membrane unit 13. In cases where the selectivity and/or permeability are/is different, the selectivity and/or permeability may be higher or lower than that of the third gas separation membrane unit 13. Making the gas selectivity of the first gas separation membrane unit 11 in operation higher than that of the second gas separation membrane unit 12—e.g., equal to or higher than that of the third gas separation membrane unit 13—is preferable from the viewpoint that the compressor power of the first compression means 21 can be reduced. Making the gas permeability of the first gas separation membrane unit 11 in operation higher than that of the third gas separation membrane unit 13—e.g., equal to or higher than that of the second gas separation membrane unit 12—is preferable from the viewpoint that the membrane area in the first gas separation membrane unit 11 can be reduced.

In order to make the gas permeability of the second gas separation membrane unit 12 higher than that of the third gas separation membrane unit 13, and make the gas selectivity of the third gas separation membrane unit 13 higher than that of the second gas separation membrane unit 12 in operation, different types of membranes may be used for the second gas separation membrane unit 12 and the third gas separation membrane unit 13. In order to make the types of membranes different among the units, the units may use: (1) separation membranes having different chemical compositions; (2) separation membranes that have the same chemical composition, but for which the production conditions (e.g., conditions for producing the membrane, the heat treatment temperature, etc.) are different; or (3) separation membranes that have the same chemical composition and production conditions, but for which the conditions for surface treatment, such as coating, are different.

It is generally known that, even if the same gas separation membrane is used, by setting the operation temperature relatively low, the gas permeability is reduced and gas selectivity is increased, compared to cases where the operation temperature is set relatively high.

Based on this fact, in the gas separation system and enriched gas production method of the present invention, the operation temperature may be made different among the units to make the gas permeability of the second gas separation membrane unit 12 higher than that of the third gas separation membrane unit 13, and make the gas selectivity of the third gas separation membrane unit 13 higher than that of the second gas separation membrane unit 12. More specifically, it is preferable to set the operation temperature of the second gas separation membrane unit 12 to a higher temperature than the operation temperature of the third gas separation membrane unit 13. By changing the operation temperature for each unit (for example, operating the third gas separation membrane unit at a relatively low temperature), even in cases where the same gas separation membrane is used for the second gas separation membrane unit 12 and the third gas separation membrane unit 13, it is possible to achieve the same effects as those in cases of using different separation membranes. It goes without saying that the present invention encompasses cases where the gas selectivity and/or the gas permeability are/is made different among the units by employing different operation temperatures for each unit and also by employing different types of membranes for the second gas separation membrane unit 12 and the third gas separation membrane unit 13. In cases of setting the operation temperature of the second gas separation membrane unit 12 to a higher temperature than that of the third gas separation membrane unit 13, it is preferable that, from the viewpoint of enhancing the effects of the present invention, the difference in operation temperature between the second gas separation membrane unit 12 and the third gas separation membrane unit 13 is 5° C. or greater, more preferably 20° C. or greater, and even more preferably 40° C. or greater.

The operation temperature of the first gas separation membrane unit may be the same as, or different from, that of the second gas separation membrane unit. In cases where the operation temperature is different, it may be higher or lower than that of the second gas separation membrane unit. The operation temperature of the first gas separation membrane unit may be the same as, or different from, that of the third gas separation membrane unit. In cases where the operation temperature is different, it may be higher or lower than that of the third gas separation membrane unit. If the operation temperature of the second gas separation membrane unit 12 is to be set higher than that of the first gas separation membrane unit 11, the range of the difference in operation temperature between the units may be similar to the range described above as the difference in operation temperature between the second gas separation membrane unit 12 and the third gas separation membrane unit 13. Further, if the operation temperature of the first gas separation membrane unit 11 is to be set higher than that of the third gas separation membrane unit 13, the range of the difference in operation temperature between the units may be similar to the range described above as the difference in operation temperature between the second gas separation membrane unit 12 and the third gas separation membrane unit 13.

The aforementioned gas permeability is the volume of permeation, through the membrane, of each gas included in the gas mixture per unit membrane area, per unit time, per unit partial pressure difference, and can be expressed as P' (unit: $\times 10^{-5}$ cm$^3$ (STP)/cm$^2$·sec·cmHg). The gas selectivity of the membrane can be expressed as the ratio of the permeability $P'_A$ of the high-permeability gas to the permeability $P'_B$ of the low-permeability gas (i.e., high-permeability gas's permeability $P'_A$/low-permeability gas's permeability $P'_B$).

From the viewpoint of further enhancing the effects of the present invention, it is preferable that the ratio of the gas selectivity of the third gas separation membrane unit 13 ($P'_A/P'_B$ (3)) to the gas selectivity of the second gas separation membrane unit 12 ($P'_A/P'_B$ (2)) (i.e., the ratio ($P'_A/P'_B$ (3))/($P'_A/P'_B$ (2))) in operation is 1.2 or greater, more preferably 1.5 or greater, even more preferably 2 or greater. Further, from the viewpoint of further enhancing the effects of the present invention, it is preferable that the ratio of the gas permeability (permeability of the high-permeability gas A) in the second gas separation membrane unit 12 $P'_A$ (2) to the gas permeability (permeability of the high-permeability gas A) in the third gas separation membrane unit 13 $P'_A$ (3) (i.e., the ratio $P'_A$ (2)/$P'_A$ (3)) in operation is 1.0 or greater, more preferably 1.1 or greater, even more preferably 1.2 or greater. Various conditions—such as the system operation temperature, and/or the material, surface treatment conditions, heat treatment conditions, etc. of the separation membranes—may be adjusted in order to set the ratio of the gas permeability and the ratio of the gas selectivity in operation to values equal to or above the aforementioned lower limits.

If the gas selectivity of the first gas separation membrane unit 11 ($P'_A/P'_B$ (1)) is to be set higher than that of the second gas separation membrane unit 12, the ratio ($P'_A/P'_B$ (1))/($P'_A/P'_B$ (2)) may be similar to the aforementioned ratios described for the ratio ($P'_A/P'_B$ (3))/($P'_A/P'_B$ (2)). If the gas permeability of the first gas separation membrane unit 11 ($P'_A$ (1)) is to be set lower than that of the second gas separation membrane unit 12, the ratio $P'_A$ (2)/$P'_A$ (1) may be similar to the aforementioned ratios described for the ratio $P'_A$ (2)/$P'_A$ (3).

If the gas selectivity of the first gas separation membrane unit 11 ($P'_A/P'_B$ (1)) is to be set lower than that of the third gas separation membrane unit 13, the ratio ($P'_A/P'_B$ (3))/($P'_A/P'_B$ (1)) may be similar to the aforementioned ratios described for the ratio ($P'_A/P'_B$ (3))/($P'_A/P'_B$ (2)). If the gas permeability of the first gas separation membrane unit 11 ($P'_A$ (1)) is to be set higher than that of the third gas separation membrane unit 13, the ratio $P'_A$ (1)/$P'_A$ (3) may be similar to the aforementioned ratios described for the ratio $P'_A$ (2)/$P'_A$ (3).

The gas separation membrane to be used in each gas separation membrane unit 11, 12, 13 may be selected as appropriate depending on the supplied gas mixture and/or the type of target product gas. Membranes conventionally used in this technical field can be used for the gas separation membranes without particular limitation. Examples of membrane materials include: rubber-state polymer materials, such as silicone resins and polybutadiene resins; glass-state polymer materials, such as polyimides, polyether imides, polyamides, polyamide imides, polysulfones, polycarbonates, and cellulose; and ceramic materials such as zeolite. The gas separation membrane may be, for example, a homogeneous membrane, an asymmetric membrane including a homogeneous layer and a porous layer, or a microporous membrane. The gas separation membrane may be housed in the casing in various forms, such as in a plate-and-frame form, spiral form, or hollow-fiber form. An example of a particularly preferable gas separation membrane is an aromatic polyimide hollow-fiber gas separation membrane having an inner diameter of approx. 30 μm to 500 μm inclusive and having an asymmetric structure in which the thickness of the homogeneous layer is from 10 nm to 200 nm inclusive and the thickness of the porous layer is from 20 μm to 200 μm.

A single gas separation membrane unit may have one gas separation membrane module, or may have a plurality of gas separation membrane modules. In cases where a single gas separation membrane unit includes two or more gas separation membrane modules, it is preferable that the modules are connected in parallel within the unit. By providing a plurality of gas separation membrane modules in each gas separation membrane unit, it is possible to easily adjust the membrane area of each unit by changing the number of gas separation membrane modules.

The gas mixture to be separated by using the gas separation system 10 of the present embodiment is not particularly limited so long as it is a gas mixture including two or more gas species. The gas separation system of the present embodiment can be suitably used, for example, in a method for separating and recovering methane gas, which is a low-permeability gas, from a biogas mainly including methane gas and carbon dioxide gas. Methane gas corresponds to the gas B which is the low-permeability gas, and carbon dioxide gas corresponds to the gas A which is the high-permeability gas. In this example, in cases where, for example, the separated-and-recovered methane gas is to be supplied to a town-gas line, a gas compressor may be provided as a compression means to the retentate gas discharge port 12b of the second gas separation membrane unit 12 and the methane gas may be pressurized to high pressures.

Next, a gas separation system according to a second embodiment of the invention and an enriched gas production method according to the second embodiment of the invention using this gas separation system are described with reference to FIG. 3. In the description of the second embodiment, features that are the same as those in the first embodiment are accompanied by the same reference signs and explanation thereof is omitted, and the description mainly focuses on features that are different from those in the first embodiment.

The gas separation system 10' of the second embodiment further includes a second compression means 22 in addition to the first compression means 21. This second compression means 22 is interposed and arranged in midstream of the permeate gas discharge line 15. The second compression means 22 is provided with the aim of pressurizing the permeate gas discharged from the permeate gas discharge port 11c of the first gas separation membrane unit 11 and supplying the pressurized permeate gas to the third gas separation membrane unit 13. The retentate gas discharge port 13b of the third gas separation membrane unit 13 is connected by the retentate gas return line 18 to a position on the discharge side of the first compression means 21, and not to the suction side of the first compression means 21, in the feed gas mixture supply line 16.

Like the gas separation system 10 of the first embodiment, also in this gas separation system 10' of the second embodiment, in operation, the gas permeability of the second gas separation membrane unit 12 is made higher than the gas permeability of the third gas separation membrane unit 13, and the gas selectivity of the third gas separation membrane unit 13 is made higher than the gas selectivity of the second gas separation membrane unit 12. In this way, the membrane area—e.g. the number of membrane modules—of the second gas separation membrane unit 12 can be reduced while maintaining the recovery rate of the target gas (particularly the low-permeability gas B) at an extremely high level. Thus, even with this gas separation system 10', the membrane area of the entire system can be reduced, as with the gas separation system 10 of the first embodiment.

Particularly, in this gas separation system 10', the permeate gas discharged from the permeate gas discharge port 11c of the first gas separation membrane unit 11 is introduced to the third gas separation membrane unit 13 in a state pressurized by the second compression means 22. Therefore, in this system 10', the third gas separation membrane unit 13 can be operated at a relatively higher pressure, and thus, the membrane area in the third gas separation membrane unit 13 can be reduced—e.g. the number of membrane modules can be reduced.

Further, in this gas separation system 10', the retentate gas discharged from the retentate gas discharge port 13b of the third gas separation membrane unit 13 is returned to a position between the discharge side of the first compression means 21 in the feed gas mixture supply line 16 and the first gas separation membrane unit 11. This retentate gas has a high pressure because of the pressurization by the second compression means 22. By returning this high-pressure retentate gas, the membrane area necessary in the first gas separation membrane unit 11 and the second gas separation membrane unit 12 can be reduced. More specifically, in cases where the second compression means 22 is not used, not only the third gas separation membrane unit 13, but also the second gas separation membrane unit 12 which supplies gas to the unit 11 as well as the unit 13, need(s) to have a certain amount of membrane area in order to recover the permeate gas from the first gas separation membrane unit 11 at a pressure higher than atmospheric pressure. Whereas, by using the second compression means 22, such a need is less likely to arise. Thus, the membrane area necessary in the first gas separation membrane unit 11 and/or the second gas separation membrane unit 12 can be reduced, as described above.

For these reasons, the gas separation system 10' of the second embodiment and the enriched gas production method using the system can reduce the membrane area in the entire system more effectively.

Further, in the second embodiment, the retentate gas at the high-pressure is supplied between the discharge side of the first compression means 21 and the first gas separation membrane unit 11 and is mixed with the feed gas mixture. Thus, compared to cases where the retentate gas is returned to the suction side of the compression means 21 as in the first embodiment, the amount of gas taken-in by the first compression means 21 can be reduced. Thus, in cases where the product gas is the gas B, assuming that the purity and the recovery rate of the gas are the same among the cases, the compression power necessary for the first compression means 21 can be reduced by using both the first compression means 21 and the second compression means 22 in combination, compared to cases where the second compression means 22 is not used. More specifically, the total compression power necessary for the first compression means 21 and the second compression means 22 can be made less than the compression power necessary for when only the first compression means 21 is used.

Also, generally speaking, if the purity and the recovery rate are the same, the gas separation selectivity is low in cases where a membrane with a high permeability is used, and this results in an increase in the gas circulating amount of the entire system and also an increase in gas compression power. In contrast, in cases where a membrane with high gas selectivity is used, gas compression power can be kept small, but the permeability is low, and so the membrane area needs to be increased. In this regard, as is clear from the comparison between Comparative Example 3 and Example 4 described further below, the second embodiment is advantageous in that, because the retentate gas supplied from the third gas separation membrane unit 13 to the first gas separation membrane unit 11 is provided with high pressure because of the pressurization by the second compression means 22, the degree of increase in the compressor power of the first compression means is small even when the gas permeability of the second gas separation membrane unit is increased, and thus, the degree of increase in the total compressor power of the first compression means and the second compression means is small.

The present invention has been described above according to preferred embodiments thereof, but the present invention is not limited to the foregoing embodiments. For example, in the foregoing embodiments, units constituted by gas separation membrane modules including hollow-fiber membranes were employed as an example of the gas separation membrane units, but other types of gas separation membrane units may be employed instead.

Further, in addition to the compression means employed in the foregoing embodiments, it is possible to provide a decompression means on the permeation side of at least one of the units in order to provide the gas mixture with driving force for peameating the separation membrane. For example, a known vacuum pump may be used as such decompression means.

EXAMPLES

The present invention is described in further detail below according to Examples thereof. The scope of the present invention, however, is not limited to these Examples.

Examples 1-3, and Comparative Examples 1 and 2

A gas mixture including carbon dioxide and methane was separated by using the gas separation system 10 illustrated in FIG. 1. A compressor was used for the first compression means 21 in the system 10. The temperature, pressure, flow rate, and composition of the gas mixture were as shown in Table 1 below. The first to third gas separation membrane units 11, 12, 13 that were employed were each made by connecting, in parallel, a plurality of gas separation membrane modules A or B. The gas separation membrane modules A and B have the characteristics shown in Table 2 below and are modules each having a casing in which gas separation membranes consisting of polyimide hollow-fiber membranes with different compositions are housed. $P'_{CO2}$, $P'_{CH4}$, and the ratio $P'_{CO2}/P'_{CH4}$ of the gas separation membrane modules A and B shown in Table 2 are values at an operation temperature of 50° C. $P'_{CO2}$, $P'_{CH4}$, and the ratio $P'_{CO2}/P'_{CH4}$ of the gas separation membrane module A' shown in Table 2 are values for when separation is performed by the gas separation membrane module A at an operation temperature of 100° C. As is clear from Table 2, the gas separation membrane module A has higher gas selectivity than the gas separation membrane module B. As regards the gas permeability, the gas separation membrane module B has a higher permeability than the gas separation membrane module A. When the gas separation membrane module A is operated at 100° C. (case A'), the gas permeability is higher and the gas selectivity is lower than when it is operated at 50° C. (case A).

Each of the first to third gas separation membrane units 11, 12, 13 that were employed was made by connecting gas separation membrane modules the type of which is indicated in Table 1 (gas separation membrane modules A or B) in parallel. The operation temperature and operation pressure of each gas separation membrane unit 11, 12, 13 were set to the values indicated in Table 1. The gas mixture was separated under those conditions. In each of the Examples and Comparative Examples, the number of modules, the total membrane area, and compressor power were obtained for when the methane purity was 95 mol % and the methane recovery rate was 99%. The results are shown in Table 1. Note, however, that for Comparative Example 2, the methane recovery rate only reached 96% regardless of increasing the total membrane area and compressor power, and thus, the minimum number of modules, minimum total membrane area, and compressor power were obtained for when the methane recovery rate was 96%. The results are shown in Table 1.

Examples 4-6, and Comparative Examples 3 and 4

Figure 3:
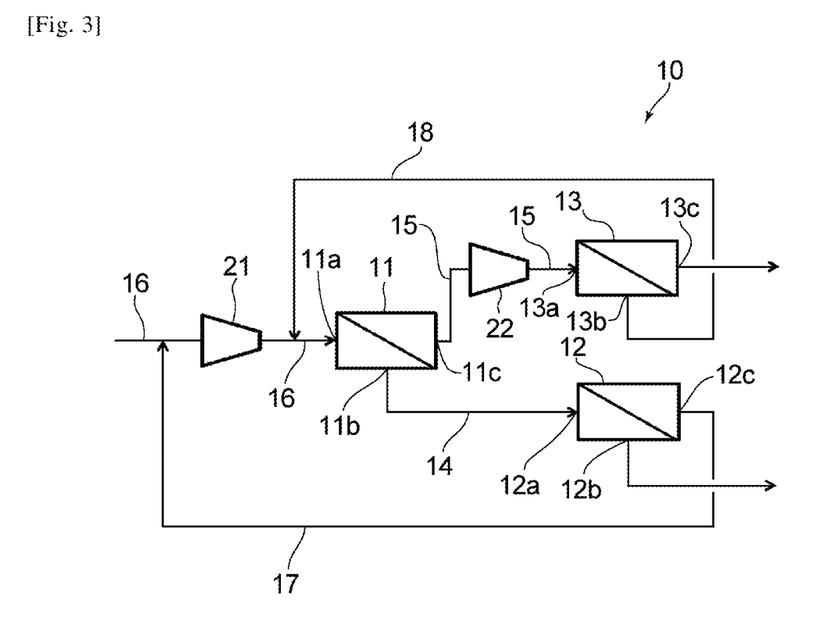
FIG. 3 is a schematic diagram illustrating the configuration of a gas separation system according to a second embodiment of the present invention.

A gas mixture was separated in the same manner as in Example 1, except that the gas separation system 10' illustrated in FIG. 3 was used. A compressor was used for each of the first and second compression means 21, 22 in the system 10'. The number of modules, the total membrane area, and compressor power were obtained for when the methane purity was 95 mol % and the methane recovery rate was 99%. Note, however, that for Comparative Example 4, the methane recovery rate only reached 94.3% regardless of increasing the total membrane area and compressor power, and thus, the minimum number of modules, minimum total membrane area, and compressor power were obtained for when the methane recovery rate was 94.3%. The results are shown in Table 1.

TABLE 1

| Example/ Comparative Example | Pattern | Input |||||||||||
|---|---|---|---|---|---|---|---|---|---|---|---|---|
| | | Feed gas ||||| Operation temperature ||| Operation pressure ||||
| | | | | | Composition || First | Second | Third | First unit || Second unit ||
| | | Temperature ° C. | Pressure MPaG | Flow rate Nm³/h | $CO_2$ mol % | $CH_4$ mol % | unit ° C. | unit ° C. | unit ° C. | Supply MPaG | Permeation MPaG | Supply MPaG | Permeation MPaG |
| Comparative Example 1 | FIG. 1 | 25 | 0.00 | 300 | 40 | 60 | 50 | 50 | 50 | 0.80 | 0.30 | 0.70 | 0.00 |
| Example 1 | | 25 | 0.00 | 300 | 40 | 60 | 50 | 50 | 50 | 0.80 | 0.30 | 0.70 | 0.00 |
| Example 2 | | 25 | 0.00 | 300 | 40 | 60 | 50 | 50 | 50 | 0.80 | 0.30 | 0.70 | 0.00 |
| Comparative Example 2 | | 25 | 0.00 | 300 | 40 | 60 | 50 | 50 | 50 | 0.80 | 0.30 | 0.70 | 0.00 |
| Example 3 | | 25 | 0.00 | 300 | 40 | 60 | 50 | 100 | 50 | 0.80 | 0.30 | 0.70 | 0.00 |
| Comparative Example 3 | FIG. 3 | 25 | 0.00 | 300 | 40 | 60 | 50 | 50 | 50 | 0.80 | 0.00 | 0.70 | 0.00 |
| Eaareple 4 | | 25 | 0.00 | 300 | 40 | 60 | 50 | 50 | 50 | 0.80 | 0.00 | 0.70 | 0.00 |
| Example 5 | | 25 | 0.00 | 300 | 40 | 60 | 50 | 50 | 50 | 0.80 | 0.00 | 0.70 | 0.00 |
| Comparative Example 4 | | 25 | 0.00 | 300 | 40 | 60 | 50 | 50 | 50 | 0.80 | 0.00 | 0.70 | 0.00 |
| Example 6 | | 25 | 0.00 | 300 | 40 | 60 | 50 | 100 | 50 | 0.80 | 0.00 | 0.70 | 0.00 |

| Example/ Comparative | Input || Output |||||||||
|---|---|---|---|---|---|---|---|---|---|---|---|
| | Operation pressure || Type of gas separation membrane module ||| | | System performance || Compressor power ||
| | Third unit || | | | | Total membrane | | | First | Second |
| | Supply | Permeation | First | Second | Third | Number of modules | First Second Third | area | $CH_4$ purity | $CH_4$ recovery | compression means | compression means |

TABLE 1-continued

| Example | MPaG | MPaG | unit | unit | unit | unit | unit | unt | m² | mol % | rate % | kW | kW |
|---|---|---|---|---|---|---|---|---|---|---|---|---|---|
| Comparative Example 1 | 0.30 | 0.00 | A | A | A | 48 | 120 | 37 | 2255 | 95.0 | 99.0 | 76.9 | — |
| Example 1 | 0.30 | 0.00 | A | B | A | 48 | 45 | 37 | 1430 | 95.1 | 99.0 | 92.5 | — |
| Example 2 | 0.30 | 0.00 | B | B | A | 28 | 44 | 37 | 1199 | 95.1 | 99.0 | 101.7 | — |
| Comparative Example 2 | 0.30 | 0.00 | B | B | B | 23 | 40 | 19 | 902 | 95.1 | 96.0 | 82.1 | — |
| Example 3 | 0.30 | 0.00 | A | A' | A | 48 | 81 | 37 | 1826 | 95.0 | 99.0 | 95.9 | — |
| Comparative Example 3 | 0.90 | 0.00 | A | A | A | 40 | 71 | 8 | 1309 | 95.0 | 99.1 | 40.6 | 15.9 |
| Eaareple 4 | 0.90 | 0.00 | A | B | A | 40 | 22 | 8 | 770 | 95.1 | 99.1 | 44.5 | 15.9 |
| Example 5 | 0.90 | 0.00 | B | B | A | 20 | 22 | 8 | 550 | 95.1 | 99.1 | 44.7 | 28.1 |
| Comparative Example 4 | 0.90 | 0.00 | B | B | B | 16 | 18 | 5 | 429 | 95.1 | 94.3 | 41.7 | 17.5 |
| Example 6 | 0.90 | 0.00 | A | A' | A | 40 | 38 | 8 | 946 | 95.0 | 99.1 | 45.4 | 15.9 |

TABLE 2

| Type of gas separation membrane module | P'CO2 | P'CH4 | P'CO2/P'CH4 | Membrane area per single module m² |
|---|---|---|---|---|
| A | 8 | 0.3 | 27 | 11 |
| A' | 11 | 1.0 | 11 | 11 |
| B | 20 | 1.6 | 13 | 11 |

P'CO2 indicates carbon dioxide gas permeability (unit: ×10⁻⁵ cm³ (STP)/cm² · sec · cmHg)
P'CH4 indicates methane gas permeability (unit: ×10⁻⁵ cm³ (STP)/cm² · sec · cmHg)
P'CO2/P'CH4 indicates gas selectivity As is clear from the results shown in Table 1, Comparative Example 1—in which the first to third gas separation membrane units in the gas separation system 10 of FIG. 1 were constituted by module A having a high gas selectivity and a low gas permeability—had the largest total membrane area among all the Examples and Comparative Examples for when the methane purity was 95 mol % and the methane recovery rate was 99%.

In contrast, it was found that, in the gas separation system of Examples 1 and 2—in which the gas permeability of the second gas separation membrane unit 12 was made higher than that of the third gas separation membrane unit 13 and the gas selectivity of the third gas separation membrane unit 13 was made higher than that of the second gas separation membrane unit 12 by employing different types of membranes—the number of modules in the second gas separation membrane unit 12 was reduced from 120 (Comparative Example 1) to 45 or less, which was 37% or less of Comparative Example 1, even though the gas purity and the gas recovery rate were the same as those in Comparative Example 1. Accordingly, it was found that the system's total membrane area in Examples 1 and 2 was reduced from 2255 m² (Comparative Example 1) to 1430 m² or less, which was 63% or less of Comparative Example 1.

Further, it was found that Example 3—in which modules constituted of the same types of membrane were operated at different temperatures—was capable of achieving the same effects as Examples 1 and 2. Also, it was found that the gas separation system 10' illustrated in FIG. 3 was capable of achieving the same effects as those of the system of FIG. 1.

Further, as is clear from the comparison between Example 1 and Example 4, between Example 2 and Example 5, and between Example 3 and Example 6, it was found that, by employing the system of FIG. 3, the total membrane area can be further reduced and also compressor power can be reduced compared to the system of FIG. 1.

REFERENCE SIGNS LIST

10, 10': Gas separation system
11: First gas separation membrane unit
  11a: Gas inlet port
  11b: Retentate gas discharge port
  11c: Permeate gas discharge port
12: Second gas separation membrane unit
  12a: Gas inlet port
  12b: Retentate gas discharge port
  12c: Permeate gas discharge port
13: Third gas separation membrane unit
  13a: Gas inlet port
  13b: Retentate gas discharge port
  13c: Permeate gas discharge port
14: Retentate gas discharge line
15: Permeate gas discharge line
16: Feed gas mixture supply line
17: Permeate gas return line
18: Retentate gas return line
21: First compression means
22: Second compression means
30: Gas separation membrane
31: Casing
32: Opening
33, 34: Tube sheet
35, 36: Lid
37: Gas inlet port
38: Retentate gas discharge port
39: Permeate gas discharge port
40: Gas separation membrane module

The invention claimed is:

1. An enriched gas production method wherein a feed gas mixture comprising methane and carbon dioxide is supplied to a gas separation system and the gas separation system is operated to produce an enriched gas in which methane is enriched, the method comprising:

employing, as the gas separation system, a gas separation system including a first gas separation membrane unit, a second gas separation membrane unit, and a third gas separation membrane unit, wherein: each of the gas separation membrane units is provided with a gas inlet port, a permeate gas discharge port, and a retentate gas discharge port; the retentate gas discharge port of the first gas separation membrane unit and the gas inlet port of the second gas separation membrane unit are connected by a retentate gas discharge line; the permeate gas discharge port of the first gas separation membrane unit and the gas inlet port of the third gas separation membrane unit are connected by a permeate gas discharge line; a feed gas mixture supply line is connected to the gas inlet port of the first gas separation membrane unit; a first compression means is interposed and arranged in midstream of the feed gas mixture supply line; the permeate gas discharge port of the second gas separation membrane unit and a position on the suction side of the first compression means in the feed gas mixture supply line are connected by a permeate gas return line; and the retentate gas discharge port of the third gas separation membrane unit and a position on the suction side or a discharge side of the first compression means in the feed gas mixture supply line are connected by a retentate gas return line;

supplying the feed gas mixture to the first gas separation membrane unit through the feed gas mixture supply line, and taking out an enriched methane gas from the retentate gas discharge port of the second gas separation membrane unit; and operating the gas separation system under conditions in which the carbon dioxide permeability of the second gas separation membrane unit is higher than the carbon dioxide permeability of the third gas separation membrane unit, and the carbon dioxide/methane selectivity of the third gas separation membrane unit is higher than the carbon dioxide/methane selectivity of the second gas separation membrane unit; wherein the carbon dioxide permeability and the carbon dioxide/methane selectivity of the second gas separation membrane unit are the same as the carbon dioxide permeability and the carbon dioxide/methane selectivity of the first gas separation, respectively, or the carbon dioxide permeability of the second gas separation membrane unit is higher than the carbon dioxide permeability of the first gas separation membrane unit and the carbon dioxide/methane selectivity of the first gas separation unit is higher than the carbon dioxide/methane selectivity of the second gas separation membrane unit, the ratio $(P'_{CO2}/P'_{CH4}(3))/(P'_{CO2}/P'_{CH4}(2))$ of the carbon dioxide/methane selectivity of the third gas separation membrane unit to the carbon dioxide/methane selectivity of the second gas separation membrane unit in operation is 2 or greater, the ratio $P'_{CO2}(2)/P'_{CO2}(3)$ of the carbon dioxide permeability in the second gas separation membrane unit to the carbon dioxide permeability in the third gas separation membrane unit in operation is 1.2 or greater, when the carbon dioxide/methane selectivity of the first gas separation membrane unit is to be set higher than the carbon dioxide/methane selectivity of the second gas separation membrane unit, the ratio $(P'_{CO2}/P'_{CH4}(1))/(P'_{CO2}/P'_{CH4}(2))$ of the carbon dioxide/methane selectivity of the first gas separation membrane unit to the carbon dioxide/methane selectivity of the second gas separation membrane unit in operation is 2 or greater, and the ratio $P'_{CO2}(2)/P'_{CO2}(1)$ of the carbon dioxide permeability in the second gas separation membrane unit to the carbon dioxide permeability in the first gas separation membrane unit in operation is 1.2 or greater.

2. The enriched gas production method according to claim 1, wherein, by setting the operation temperature of the second gas separation membrane unit higher than the operation temperature of the third gas separation membrane unit, the gas permeability of the second gas separation membrane unit is made higher than the gas permeability of the third gas separation membrane unit, and the gas selectivity of the third gas separation membrane unit is made higher than the gas selectivity of the second gas separation membrane unit.

3. The enriched gas production method according to claim 1, wherein by using different types of gas separation membranes between the second gas separation membrane unit and the third gas separation membrane unit, the gas permeability of the second gas separation membrane unit is made higher than the gas permeability of the third gas separation membrane unit, and the gas selectivity of the third gas separation membrane unit is made higher than the gas selectivity of the second gas separation membrane unit.

4. The enriched gas production method according to claim 1, wherein
a second compression means is interposed and arranged in midstream of the permeate gas discharge line; and
the retentate gas discharge port of the third gas separation membrane unit and the position on the discharge side of the first compression means in the feed gas mixture supply line are connected by the retentate gas return line.

5. The enriched gas production method according to claim 1, wherein
no second compression means is interposed and arranged in midstream of the permeate gas discharge line; and
the retentate gas discharge port of the third gas separation membrane unit and the position on the suction side of the first compression means in the feed gas mixture supply line are connected by the retentate gas return line.

6. The enriched gas production method according to claim 1, comprising operating the gas separation system under conditions in which methane recovery rate is 99.0% or greater.

7. The enriched gas production method according to claim 1, comprising operating the gas separation system under conditions in which:
the carbon dioxide permeability and the carbon dioxide/methane selectivity of the first gas separation membrane unit are the same as the carbon dioxide permeability and the carbon dioxide/methane selectivity of the third gas separation, respectively, or
the carbon dioxide permeability of the first gas separation membrane unit is higher than the carbon dioxide permeability of the third gas separation membrane unit and the carbon dioxide/methane selectivity of the third gas separation unit is higher than the carbon dioxide/methane selectivity of the first gas separation membrane unit,
when the carbon dioxide/methane selectivity of the third gas separation membrane unit is to be set higher than that of the first gas separation membrane unit, the ratio $(P'_{CO2}/P'_{CH4}(3))/(P'_{CO2}/P'_{CH4}(1))$ of the carbon dioxide/methane selectivity of the third gas separation membrane unit to the carbon dioxide/methane selectivity of the first gas separation membrane unit in operation is 2 or greater, and the ratio $P'_{CO2}(1)/P'_{CO2}(3)$ of the carbon dioxide permeability in the first gas separation membrane unit to the carbon dioxide permeability in the third gas separation membrane unit in operation is 1.2 or greater.

* * * * *